Figure 1:
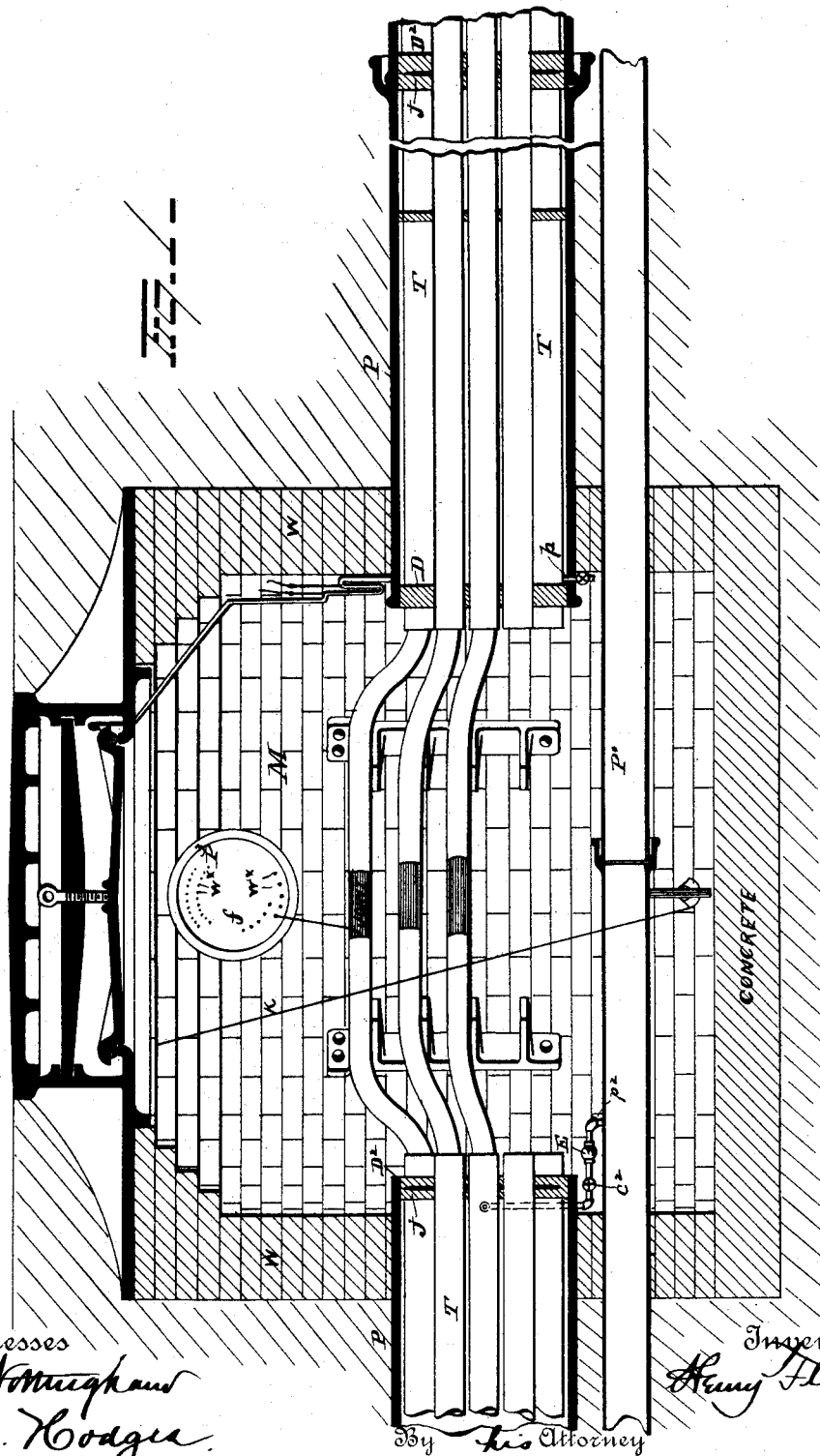

(No Model.) 6 Sheets—Sheet 1.
H. FLAD.
UNDERGROUND ELECTRIC CONDUIT.

No. 430,010. Patented June 10, 1890.

Witnesses
Inventor
Henry Flad
By his Attorney (No Model.) 6 Sheets—Sheet 2.
H. FLAD.
UNDERGROUND ELECTRIC CONDUIT.
No. 430,010. Patented June 10, 1890.
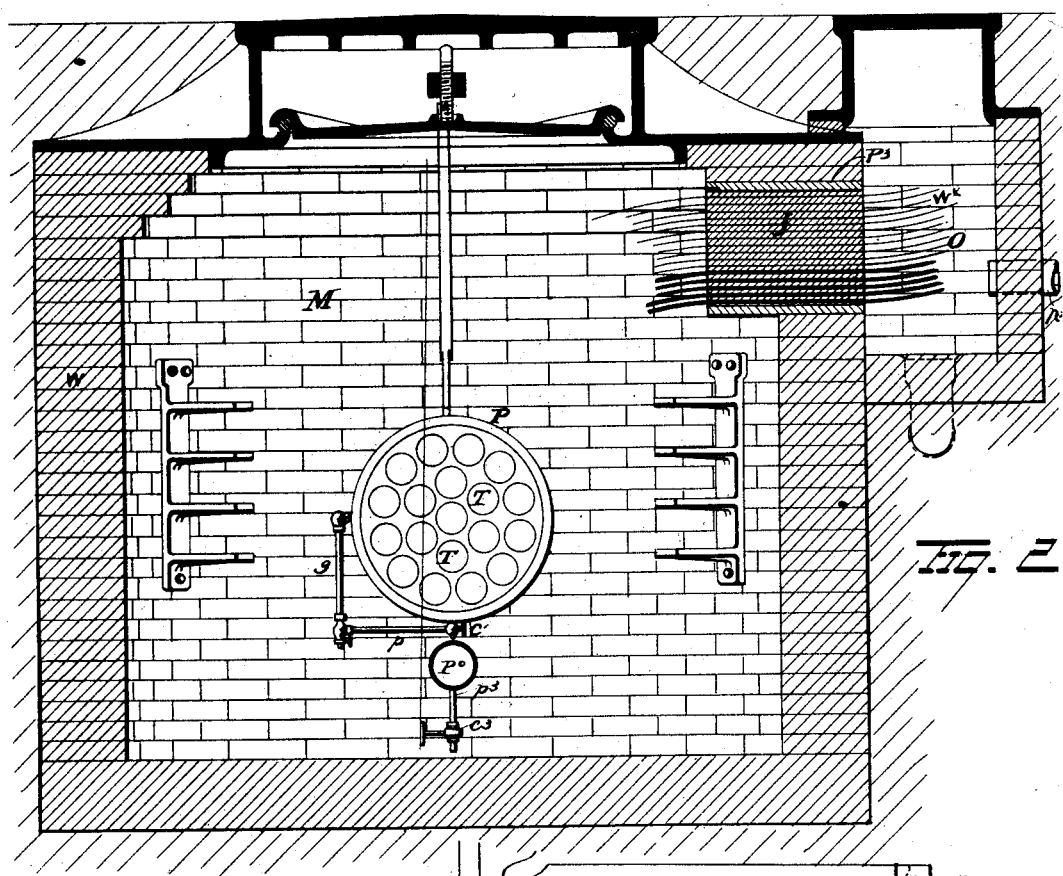
Fig. 2
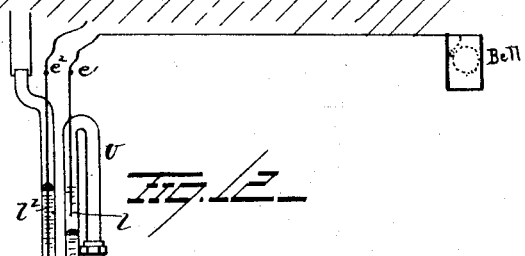
Fig. 12
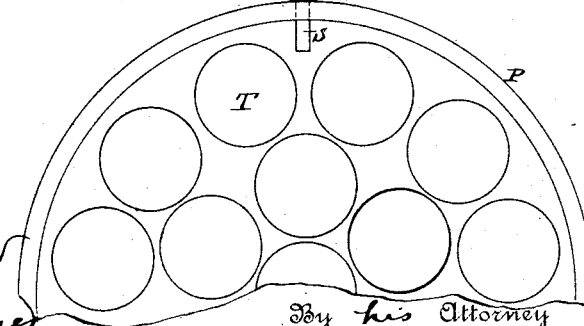
Witnesses
E. D. Nottingham
U. E. Hodges
Inventor
Henry Flad
By his Attorney
H. A. Seymour (No Model.) 6 Sheets—Sheet 3.
H. FLAD.
UNDERGROUND ELECTRIC CONDUIT.
No. 430,010. Patented June 10, 1890.
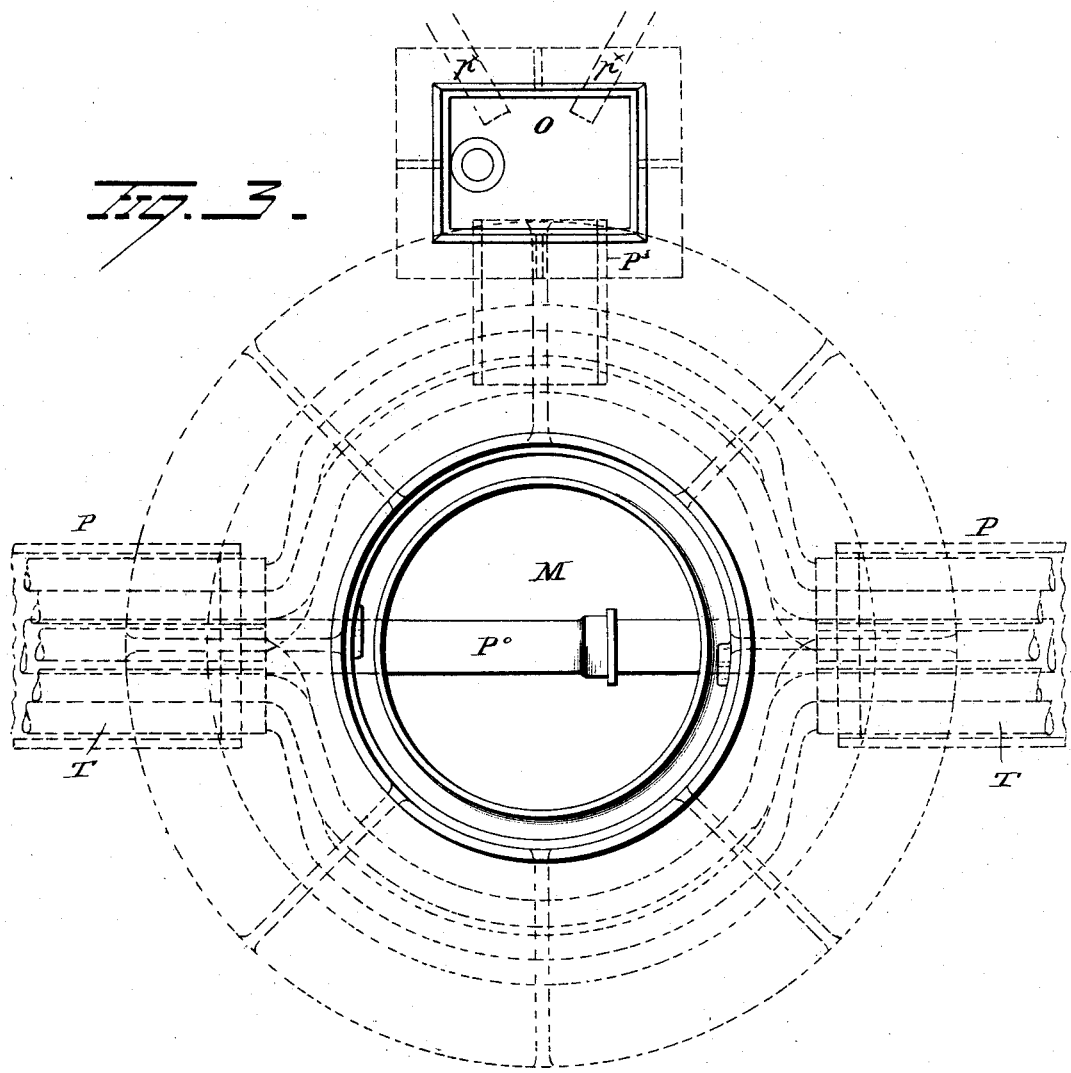
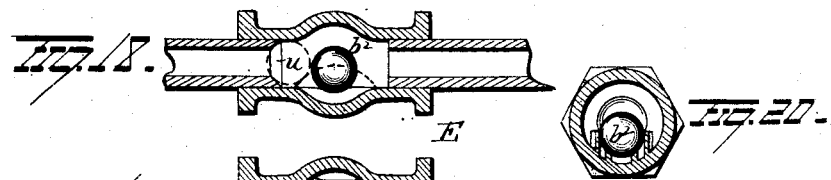
Witnesses
Inventor
Henry Flad.
By his Attorney (No Model.) 6 Sheets—Sheet 4.
H. FLAD.
UNDERGROUND ELECTRIC CONDUIT.
No. 430,010. Patented June 10, 1890.
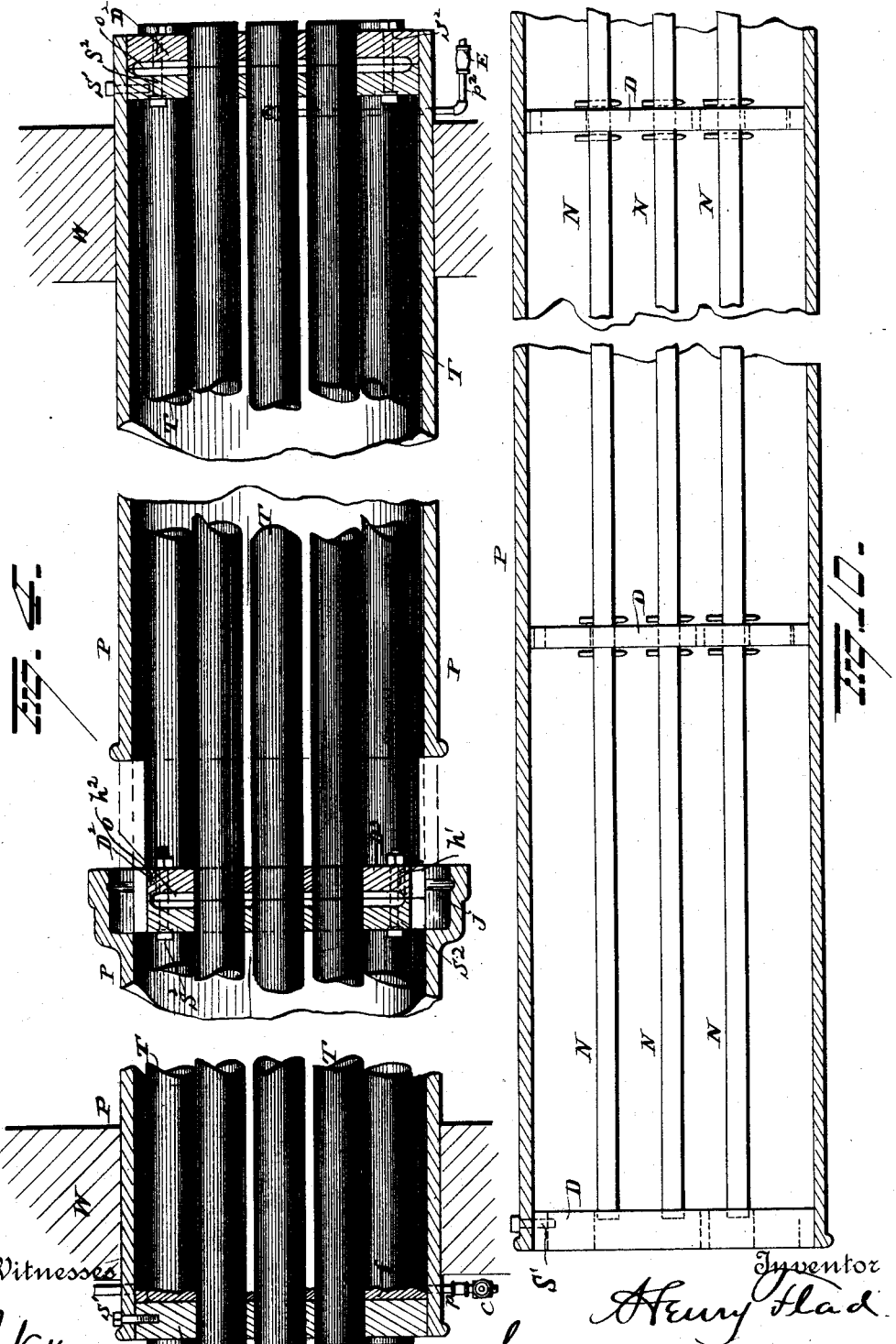

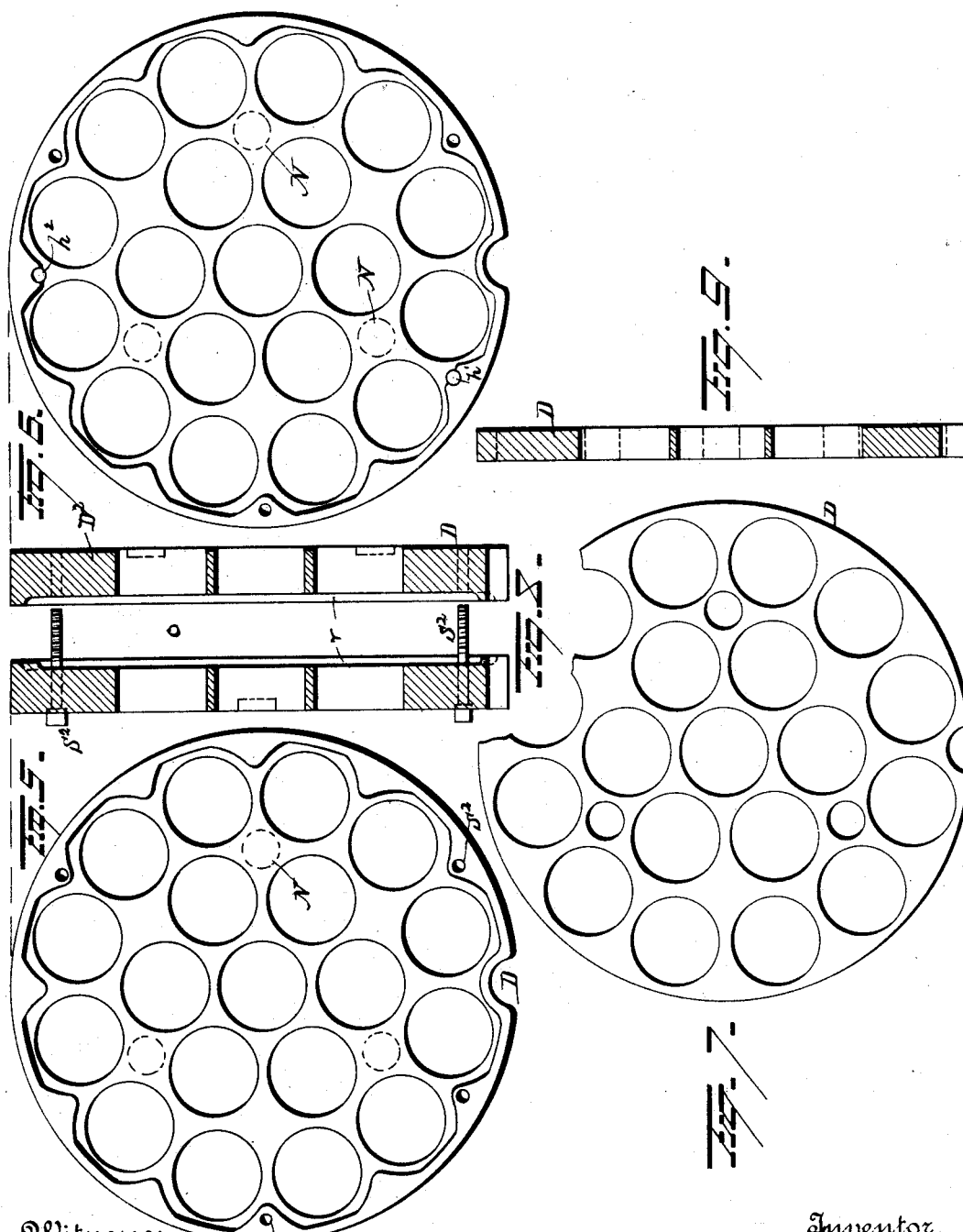

(No Model.) 6 Sheets—Sheet 6.
H. FLAD.
UNDERGROUND ELECTRIC CONDUIT.
No. 430,010. Patented June 10, 1890.
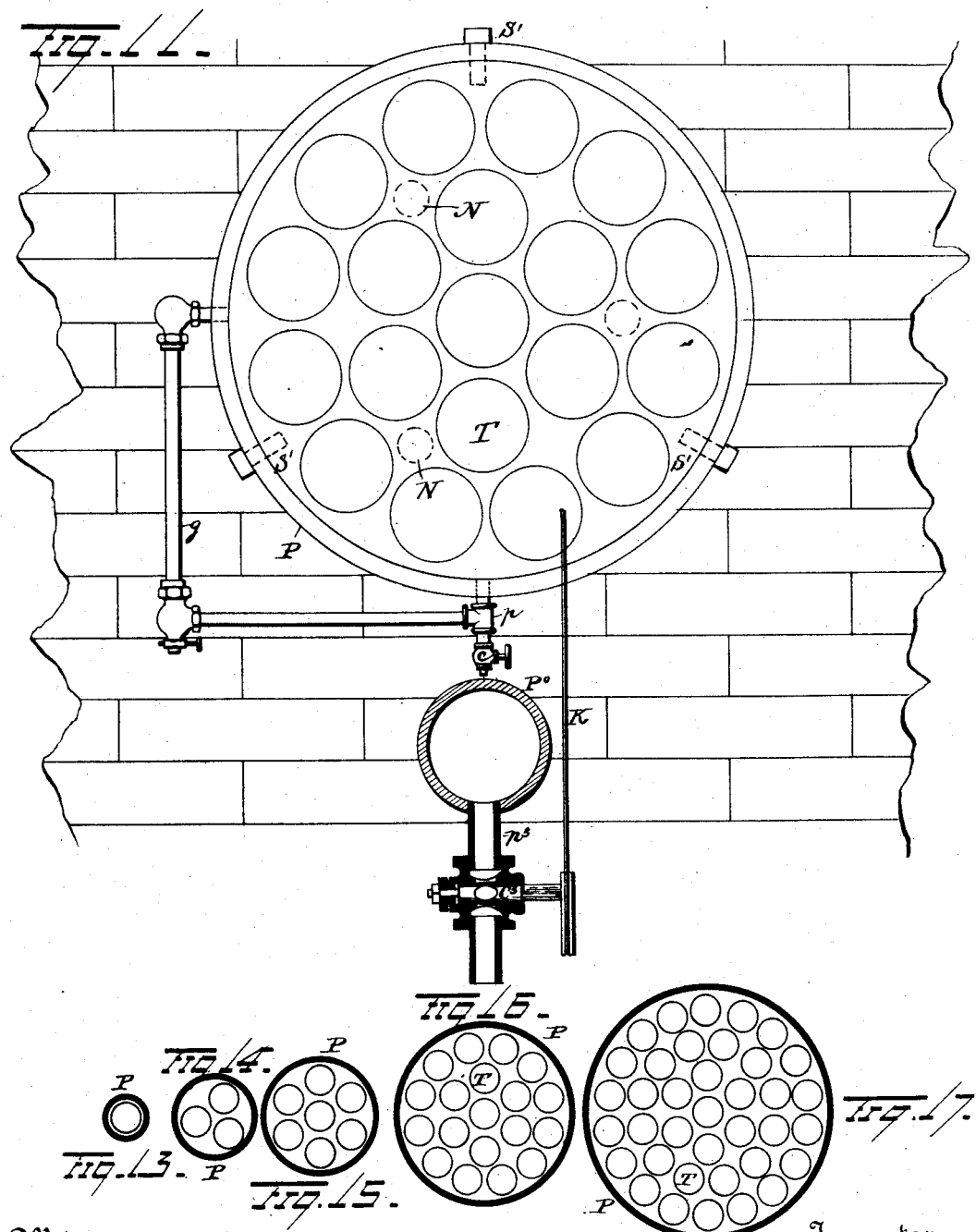

UNITED STATES PATENT OFFICE.

HENRY FLAD, OF ST. LOUIS, MISSOURI.

UNDERGROUND ELECTRIC CONDUIT.

SPECIFICATION forming part of Letters Patent No. 430,010, dated June 10, 1890.

Application filed September 18, 1889. Serial No. 324,322. (No model.)

*To all whom it may concern:*

Be it known that I, HENRY FLAD, a resident of the city of St. Louis, in the State of Missouri, have invented certain new and useful Improvements in Underground Electric Conduits; and I do hereby declare the following to be a full, clear, and exact description of the invention, such as will enable others skilled in the art to which it appertains to make and use the same.

My invention relates to an improvement in conduits for carrying electric wires under ground.

The main difficulty encountered in underground conduits consists in the leaking into the ducts of gas and water from surrounding ground. Both destroy the insulating materials, and explosions frequently occur from the presence of gas, damaging the conduits and conductors and endangering the lives of employés and of people passing along the street. It is clear that as long as the pressure of air inside the ducts containing the cables is greater than the gas and water contained in the ground no gas or water can enter the ducts. The pressure of gas in the street-mains rarely exceeds .07 pounds per square inch, and the pressure of gas in the ground could of course be no greater. The pressure of one-fourth pound per square inch of the air with which the pipe is filled would therefore be ample to secure the conduits against the entrance of gas from the ground surrounding it. The pressure of water contained in the surrounding ground would generally exceed that due to the presence of a column of water equal to the distance of the pipe below the surface of the street, or .43 pounds by the depth in feet. Only in rare cases when the surface of the street offers greater resistance than usual and the water in the ground is under greater pressure than due to its depth—as, for instance, in the case of a water-pipe in the vicinity of the conduit bursting under a concrete foundation—a greater pressure could prevail outside the conduit. This might be prevented by putting occasional drains below the concrete foundation leading to the sewers, or by inserting tubes in the concrete filled with sand at points where such danger might be apprehended, so that the water could find its way through the concrete foundation.

It is the object of my invention to obviate these difficulties, and I propose to keep the enveloping-pipes alone filled with compressed air by closing the two ends of the pipes at each man-hole with diaphragms of some material such as asphaltum, placed between the ducts containing the wires, which are laid in it, and the sides of the pipe, and introducing compressed air through a pipe or pipes entering the duct inside one of the diaphragms.

To this end my invention consists in certain novel features of construction and combinations of parts, as will be hereinafter described, and pointed out in the claims.

In the accompanying drawings, Figure 1 is a longitudinal sectional view through the conduit and man-holes. Fig. 2 is a transverse section through a man-hole. Fig. 3 is a plan view. Fig. 4 is an enlarged sectional view through broken portions of the ducts and enveloping-pipes. Figs. 5, 6, and 7 are elevations of the various forms of diaphragms used. Figs. 8 and 9 are sectional views of the diaphragms. Fig. 10 is a sectional view through a length of enveloping-pipe, showing the wooden rods. Fig. 11 is an enlarged transverse section through one of the man-holes. Fig. 12 is a view showing the manometer. Figs. 13, 14, 15, 16, and 17 are transverse sections through different-sized ducts, and Figs. 18, 19, and 20 show views of automatic strap-valve.

A line of cast-iron pipes P P, of the ordinary length and thickness of metal such as is used in the distribution of illuminating-gas from gas-works, is laid in a straight line between two man-holes from one hundred to five hundred feet apart. Each pipe contains a number of tubes or ducts T T, generally from two and one-half to three inches in diameter, and made of thin sheet metal (iron, zinc, or copper,) or other material. Preferably, three, seven, nineteen, or thirty-seven ducts are inclosed in the cast-iron pipe which envelops the ducts, and in these ducts the electric cables are placed. The ducts are held at their proper distance apart by means of perforated diaphragms D D, through which they pass. These diaphragms are made of indurated fiber or some other suitable substance. The diaphragms D D are held at proper distances apart longitudinally by wooden distance-pieces N N. Each cast-iron pipe P P is usually fitted up with its cluster of ducts T T, diaphragms D D, and distance-pieces N N, in the shop, before being taken out to the work. Each section of the conduit, containing from ten to forty or more pieces, terminates at its ends in a man-hole M, which is, as far as practicable, made air-tight. The cast-iron pipes at the ends of a section pass through the wall W of the man-hole M and protrude a few inches into it, and the opening of the cast-iron pipe inside the man-hole is closed with a perforated diaphragm D, which is fitted closely into the cast-iron pipe and around the ducts. It is secured in place by screws S' S', which pass through holes drilled in the circumference of the cast-iron pipe P and into the diaphragm D. The first pipe P starting from the man-hole has the diaphragm D fastened to it before it is taken to the work, and the ducts in the first pipe protrude a few inches beyond the end of the cast-iron pipe. The joints between the diaphragm D, the ducts T T, and the inside of the cast-iron pipe P P are made tight by the use of paraffine, shellac, or similar material, poured in a molten state into pipe P while the pipe is held in a vertical position. A double diaphragm $D^2$, which serves to close the end of one of the pipes P protruding into the man-hole at the other end of the section, is made of two parts, which, when fastened together, leave an open space $o$ between them. When the pipe is laid and the diaphragm $D^2$ is secured to the pipe by screws S' S', this open space $o$ is filled with paraffine or a similar substance, being forced into it while in a melted state through hole $h'$ until it comes out of the hole $h^2$. It is then allowed to cool, and the two holes $h'$ $h^2$ are closed with plugs. The ducts, except those in the first and last pipe in each section, are made of the same length as the cast-iron pipe when laid—say, from twelve to twenty feet—so that when the cast-iron pipe is in proper position to pour molten metal to form the joint $j$ the corresponding ducts in adjoining pipes butt against each other.

For jointing the ducts diaphragm $D^2$ is used. This consists of two halves, both perforated to allow the ducts to pass through. Each half has a recess $r$ on the side next to the joint and is attached to the end of one of the clusters of ducts which are to be jointed. The pipe to be laid, having been placed in exact prolongation of the preceding pipe, and so as to leave an open space of a few inches between the ends of the iron pipes, the cluster of ducts in the pipe to be laid, together with the diaphragms and distance-pieces, are slid back in the cast-iron pipe toward the man-hole in the rear until the ends of the ducts and the rims of the half-diaphragms butt against each other. The two halves of the diaphragm are then fastened together by means of the screw-bolts $S^2$ $S^2$. Paraffine, varnish, or some similar material, is then in a molten state pumped into the bottom hole $h'$, until it makes its appearance at the upper hole $h^2$. The material is allowed to cool, and then the two holes are plugged. The forward cast-iron pipe is then slipped back over the ducts to the proper position, and this having been done the lead joints between the two cast-iron pipes are made. The last pipe P in each section of the line of conduit and the ducts and the three distance-pieces contained in it have to be cut to special lengths to protrude into the man-hole the proper distance.

To prevent gas from the surrounding soil from entering the cast-iron pipes, the space contained within the pipes and around the ducts is to be at all times kept filled with air compressed to about four ounces pressure per square inch. If any leaks exist in the cast-iron pipes, the air inside of them, being under greater pressure than the air in the soil could possibly be, (since the pressure in the soil could not be greater than the pressure of gas in the distributing system, which does not generally exceed two and one-half to four inches of water,) will flow outward, and no gas can enter. If water contained in the surrounding soil is under a head greater than seven inches, it may leak through the joints of the cast-iron pipes; but in a well-laid pipe the quantity leaking into it would be but trifling. Any water which does enter the pipes P P will not come in contact with the ducts, but will run off to the bottom of the cast-iron enveloping-pipe and along its bottom to the lower end of the section, as every section is laid with an inclination toward one of the man-holes. At the lower end of each section a small pipe $p$ is inserted in the bottom of the cast-iron pipe with the drain-cock $c'$ in it. The water collects in this pipe, and its presence is shown by the glass tube $g$, which forms a part of it. Whenever any water is observed in the glass tube $g$, the cock $c'$ is opened, and the compressed air drives the water out. When the water is all out of the pipe, the cock $c'$ is closed. It would be possible to keep not only air but water out of the cast-iron pipe by maintaining the air under a pressure of three or four pounds; but this would increase the leakage very much and consequently the expense of supplying compressed air.

Compressed air is distributed to the different sections of the conduit by a cast-iron pipe $P^0$ laid along the line. It is supplied to this pipe by a gasometer at the central station, into which a blower forces dry air. The diameter of pipe $P^0$ varies according to the quantity of compressed air required in the different sections and their distance from the central station. The compressed air (under one-fourth pound pressure) is introduced into each section of the conduit by a connecting-pipe $p^2$, placed at the higher end of the section. In the pipe $p^2$, leading from the pipe $P^0$ to the pipe P, is a cock $c^2$, by means of which the air may be shut off from the pipe P, so that the air will not escape through the pipe $p^2$ when the air in the section, on account of repairs, cannot be kept under pressure. By some accident a large leak might suddenly occur in one of the sections of the conduit, allowing the air to escape from pipes P into the surrounding soil. This would cause a large quantity of compressed air to be drawn from the pipe P through the connecting-pipe $p^2$, and would lower the pressure in the other sections of the conduit. To prevent this, the device E is inserted in the pipe $p^2$, leading from $P^0$ to P. When the air travels at a speed just sufficient to make up the ordinary leakage, it passes above and around the ball $b^2$; but when, owing to a large leak occurring in pipe P or in its ducts, the air entering the section from pipe P through pipe $p^2$ flows at great velocity. Its impact will move the ball $b^2$ forward on the inclined plane on which it rests, and when the ball reaches the seat $u$ all further escape of air from pipe $P^0$ will be stopped. There is also a device to be placed at the lower end of every section of the conduit by which the occurrence of any serious leak in any section of the conduit is at once indicated at the central station. It consists of a mercury manometer U, placed at the top of the cast-iron pipe P at the lower end of each section. Electric wires $e'$ $e^2$, connecting with a battery at the central station, are placed in each branch $l$ $l^2$ of the manometer, and so arranged that when an electric circuit is established through the wires the fact is announced at the central station, one wire $e^2$ reaching down into the mercury contained in branch $l^2$ at all times, the other wire $e'$ to a point of branch $l$ where the mercury will not touch it as long as the air in the pipe is under normal pressure; but when, owing to an occurrence of a large leak in pipe P the column of mercury in branch $l$ of the manometer rises and reaches the end of the copper wire $e'$, an electric circuit is established and notice of the break announced at the office. Branch $l^2$ is connected by a small pipe with the outside air, as shown in Figs. 1, 2, and 12. The pipe $P^0$, where it passes through a man-hole, has inserted into it a short tube $p^3$, closed by a cock $c^3$, which may be opened by the workman by means of the chain K after the man-hole has been opened and before entering it if any suspicion exists of gas having accumulated in it. The compressed air which leaks through the joints into the ducts flows to the man-holes, and if the man-holes are air-tight will gradually raise the pressure of air in the ducts and man-holes. If the supply of air is abundant, it will bring the pressure of the air in ducts and man-holes up to the standard pressure which prevails in pipe P P and in the space between the ducts. When this point is reached, leakage of air to the outside will be confined to the walls and covers of the man-holes and to the joints of the enveloping-pipes P, and if the man-hole is reasonably air-tight it will require but little air to make up for leakage and to maintain the pressure in man-hole and in the enveloping-pipe P; but at every opening of a man-hole the compressed air inside the ducts and man-holes will be reduced to ordinary pressure, while the air in the space between the enveloping-pipes and ducts retains its pressure and prevents the entrance of gas into the pipe P.

For distributing the electricity to the houses along the section of conduit, one or more pipes $p^\times$, containing wires, have to be laid from each man-hole to the houses on the section of the conduit, and these pipes are more exposed to the influx of gas than the conduit proper and may deliver it into the man-hole; also, that the pressure of air cannot be maintained in ducts and man-holes as long as these secondary pipes are in open communication with man-holes and houses.

To shut off communication between the man-holes and the secondary pipes $p^\times$, I propose to insert one or two short pipes $P^3$ in the wall of the man-holes when first constructed, in which a number of short wires $w^\times$ $w^\times$ are placed, surrounded by paraffine $f$ $f$ or some similar substance. The number and diameter of the wires $w^\times$ is determined with a view of ultimately supplying all the connections which may have to be made in the future at any man-hole. The ends of the wires $w^\times$ $w^\times$ outside the man-holes are placed in a hand-hole O and will protrude into it sufficiently from the paraffine that they can be connected with the wires leading into the houses. Inside the man-holes they protrude so that they can be connected with the wires taken out of the cables. The ends of the wires inside and outside of the wall may also be carried to a switch-board on each side of the wall. If the air in every part of the conduit, including man-holes, is kept under pressure, the ground around the line will be saturated with air, instead of with gas, as at present, and when the pressure in the man-holes and ducts is allowed to go down for a short time gas could not reach the man-holes for some time nor the ducts, which would still be surrounded by compressed air contained between the ducts and pipe P and flowing out through any leaks that may be in the pipe-line. The escape of air from man-holes and ducts of the whole conduit, however, will take place every time that any man-hole is opened for the purpose of putting in a cable or making connections. The length of time during which the ducts and man-holes are without the protection of compressed air could be much reduced by restricting all work requiring the opening of man-holes to certain hours of each day. Ordinarily a system of circuits would start out from the central station in four divisions, each of which would have its independent air-supply all furnished, however, from a central station. If the conduit is thus divided into four divisions and the work in each division confined to six hours per day in two separate shifts of three hours each, the man-holes and ducts would contain air of ordinary atmospheric pressure during three hours twice a day, and the pressure would have to be restored the same number of times; but during these three hours the current of air had been flowing outward for nine hours through any leaks in the man-holes and filling the surrounding soil could hardly be changed to an inward flow of gas. As the over-pressure is equal to but seven inches of water, it will take but a short time to restore the pressure.

The quantity of air required for restoring the pressure of air in man-holes and ducts after they have been opened will be furnished directly into large man-holes located at the central station, and will be distributed to the other man-holes through the ducts.

Having fully described my invention, what I claim as new, and desire to secure by Letters Patent, is—

1. In an underground electric conduit, the combination, with substantially air-tight enveloping pipe or pipes for conducting electric wires, of a compressed-air pipe or supply-chamber in communication with said enveloping pipe or pipes for maintaining a suitable pressure within the enveloping pipe or pipes, substantially as set forth.

2. In an underground electric conduit, the combination, with a closed underground enveloping-conduit for conducting electric wires, of a compressed-air pipe or reservoir in communication with the conduit for maintaining a constant pressure of air within the conduit greater than the possible pressure of air or gas or other fluid in the surrounding soil, substantially as set forth.

3. In an underground electric conduit, the combination, with man-holes inclosing pipes sealed at the ends and ducts in said pipes for conducting electric wires, of a compressed-air main having outlets which discharge into the pipes, substantially as set forth.

4. The combination, with an enveloping-pipe and ducts, of a manometer connected with the enveloping-pipe adapted to receive the pressure of the air contained therein and an annunciator having electrical connection with the manometer for indicating any large reduction of overpressure of air contained in the enveloping-pipe, substantially as set forth.

5. The combination, with enveloping-pipes and ducts contained therein, of diaphragms for sealing the enveloping-pipes, all or a portion of said diaphragms composed of two parts secured together and having a filling between them, substantially as set forth.

6. In combination with the main air-pipe, a short discharge-pipe inserted at right angles downward from said air-pipe and provided with a cock, which when opened allows a large quantity of air to enter the man-hole for the purpose of ventilation.

7. In combination with the system of conduit herein described, a pipe or pipes passing through the wall of the man-hole and containing a sufficient number of short electric wires surrounded by paraffine or some similar material, with which wires taken from the cables inside the man-hole may be connected, while the outside ends of the wires can be connected with wires which are to be carried through houses in the neighborhood, thus preventing when the man-holes are closed the entrance of gas through the secondary pipes into the man-hole and the escape of air from the man-holes and ducts.

8. In combination with each man-hole, one or more hand-holes with covers, in which the short wires passing through paraffine can be connected with the secondary wires leading to houses.

9. The combination, with man-holes and enveloping-pipes connecting these man-holes, of a drip-pipe in the lower end of each section of enveloping-pipe and a pipe for indicating the presence of water within the pipe, substantially as set forth.

10. In combination with an incasing-pipe, diaphragms therein, and rods connecting said diaphragms, substantially as set forth.

11. In combination with an incasing-pipe, wire-ducts, and diaphragms, wooden rods extending through the pipe and connecting the diaphragms, substantially as set forth.

In testimony whereof I have signed this specification in the presence of two subscribing witnesses.

HENRY FLAD.

Witnesses:
 EMORY S. FOSTER,
 C. H. DANA.